(No Model.)
P. ROHAN.
FEED WATER HEATER AND FILTER.
No. 387,696. Patented Aug. 14, 1888.
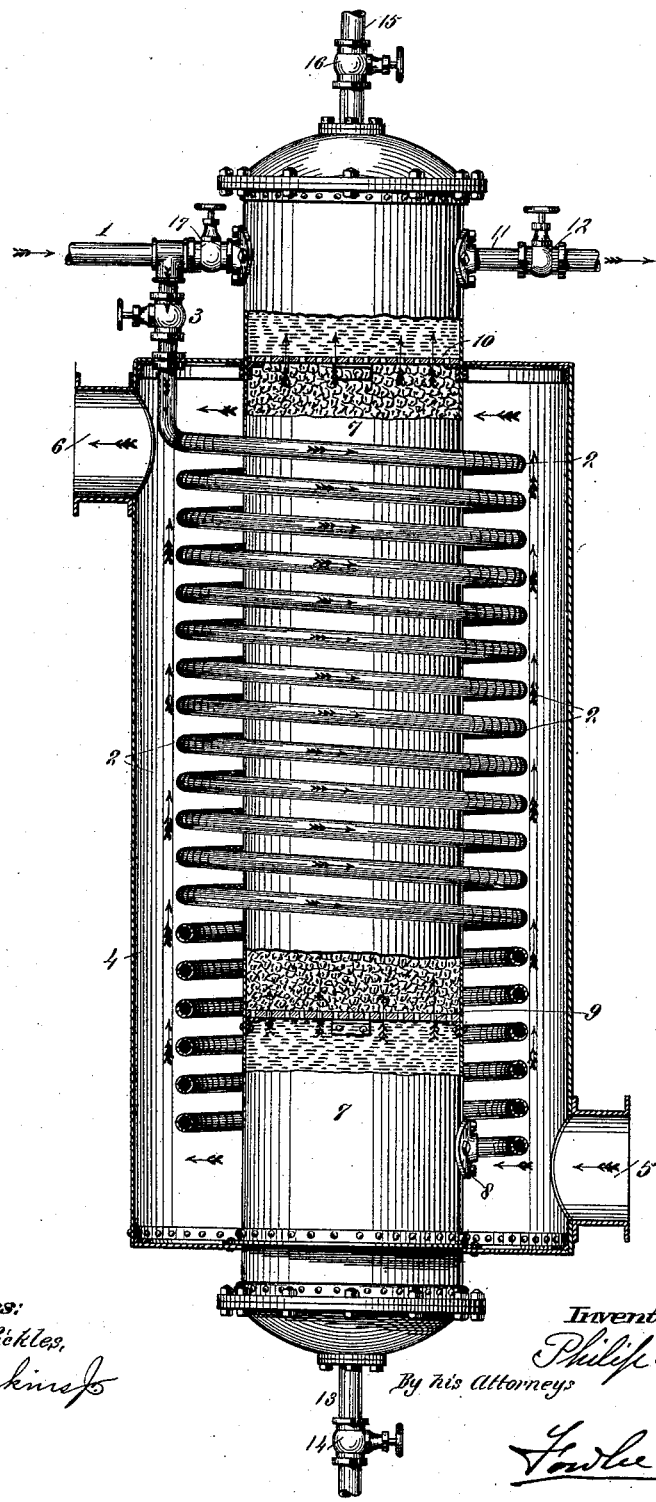
Witnesses:
Charles Pickles.
N. W. Perkins Jr.
Inventor:
Philip Rohan,
By his Attorneys
Fowler & Fowler

UNITED STATES PATENT OFFICE.

PHILIP ROHAN, OF ST. LOUIS, MISSOURI.

FEED-WATER HEATER AND FILTER.

SPECIFICATION forming part of Letters Patent No. 387,696, dated August 14, 1888.

Application filed March 17, 1888. Serial No. 267,451. (No model.)

*To all whom it may concern:*

Be it known that I, PHILIP ROHAN, a citizen of the United States, residing at St. Louis, in the State of Missouri, have invented a new and useful Feed-Water Heater and Filter, of which the following is such a full, clear, and exact description as will enable any one skilled in the art to which it appertains to make and use the same, reference being had to the accompanying drawing, forming part of this specification.

The objects of the invention are to filter the water that is fed to steam-boilers and to heat said water by exhaust-steam, so that when it reaches the boiler it will not require so much useful heat to transform it into steam.

My invention is for an improved apparatus for accomplishing these objects, and will now be set forth in detail, and the novel features thereof particularly pointed out in the claims appended hereto.

The accompanying drawing shows an elevation, partly in section, of an apparatus embodying one form of my invention.

1 is a cold-water connection which leads from any source of water-supply or pump.

2 is a coil of pipe connected therewith, and has a stop-cock, 3, therein, so that the supply of water may be shut off from said coil. Surrounding this coil is a jacket or drum, 4, which is provided with two ports, 5 and 6, the former leading from the engine-exhaust and the latter being the exhaust from my heater. The steam from the engine passes in the direction of the arrows through the ports 5 6, exhausting from the latter into the atmosphere. Within the drum 4 is a second drum, 7, preferably concentric with the same and of considerably smaller diameter. The coil before referred to encircles the drum 7 in a spiral and pierces the same at the point 8.

Within the interior drum, 7, are placed two perforated plates, 9 10. Between these plates in the drum is arranged any suitable kind of filtering substance for the water. Coke is preferable for this purpose. The water passes through the filtering-chamber in the direction indicated by the arrows to the pipe-connection 11, through which it passes in the direction of the arrow. This pipe is provided with a cock, 12, so that the water can be shut off. The pipe 11 feeds the water to the boiler. The lower end of the drum 7 passes through the head of the drum 4, and is provided at its lower end with a blow-off, 13, which has a cock, 14, for controlling the same. Below the perforated plate 9, within the drum 7, is formed a settling-chamber. The blow-off 13 allows the mud and sediment to be removed whenever desired. Connected to the upper part of the drum 7 is also a surface blow-off, 15, which is controlled by a cock, 16. This may be used to blow off any grease or scum that is on the surface of the water. The cold-water connection 1 is extended so as to perforate the upper chamber of the drum 7, and is controlled by a valve or cock, 17, which is normally closed. The cocks 3 and 7 are normally open, so that the water may circulate through the coil between the drums and become heated by the steam exhausted from the engine, which passes between said drums in the direction indicated by the arrows. The water, when it becomes so heated, passes through the hot-water connection 8 to the lower or settling chamber of the drum 7 through the coke-chamber, and from thence to the upper chamber of the drum 7 to the hot-water pipe 11. The cocks 16 and 14 are of course normally closed. When it is desired to blow out the sediment, the cocks 3 and 12 are closed and the cocks 17 and 14 opened. This allows the water to pass in a reverse direction through the filter, which forces the sediment out through the blow-off 13. When it is desired to make use of the surface blow-off, the cock 12 is closed and the cock 16 is opened. This allows the water to circulate through the coil and up through the filter, where it then passes directly through the surface blow-off 15; or the cock 3 can be closed as well as the cock 12, and the cock 17 opened, when the cold water will pass directly through the upper chamber of the drum 7 and out through the surface blow-off 15. Either method may be employed.

The construction of my apparatus is simple and its cost but little. It effects economy, in that so much useful heat of the furnace does not have to be expended upon the feed-water, and at the same time it filters the water.

Having now fully set forth my invention, what I desire to claim and secure by Letters Patent of the United States as my invention is—

1. The combination of the coil of pipe 2, the cold-water feed-connection 1, the drum 4, having ports 5 6, for the purpose described, a second drum, 7, within the first-mentioned drum, connected with the coil 2 at the point 8, a filtering-chamber within said second drum, a settling-chamber beneath said filtering-chamber, having a blow-off and cock controlling said blow-off, a hot-water connection, 11, controlled by a cock, an upper chamber within said second drum, a surface blow-off, 15, connected to the same and controlled by a cock, an extension of the cold-water connection 1, piercing said upper chamber and controlled by a cock, 17, and a cock, 3, controlling the circulation within the coil, substantially as and for the purpose described.

2. The combination of a coil of pipe, a cold-water feed-connection, a drum surrounding the same, having ports permitting a circulation of exhaust-steam therein, a second drum within the first-mentioned drum, connected with said coil at its lower end, a hot-water or steam boiler connection controlled by a cock for said second drum, and a surface blow-off controlled by a cock connected with the upper part of said second drum.

In testimony whereof I have hereunto set my hand, this 14th day of March, 1888, in the presence of the two subscribing witnesses.

PHILIP ROHAN.

Witnesses:
ALBERT C. FOWLER,
J. L. HAUK.